United States Patent
Lim et al.

(10) Patent No.: US 8,054,034 B2
(45) Date of Patent: Nov. 8, 2011

(54) BATTERY MANAGEMENT SYSTEM TO MANAGE A BATTERY HAVING A PLURALITY OF CELLS AND DRIVING METHOD THEREOF

(75) Inventors: Gye-Jong Lim, Yongin-si (KR);
Han-Seok Yun, Yongin-si (KR);
Se-Wook Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 623 days.

(21) Appl. No.: 11/835,055

(22) Filed: Aug. 7, 2007

(65) Prior Publication Data

US 2008/0090133 A1 Apr. 17, 2008

(30) Foreign Application Priority Data

Oct. 12, 2006 (KR) .................. 10-2006-0099343

(51) Int. Cl.
*H02J 7/00* (2006.01)
*H01M 10/44* (2006.01)
*H01M 10/46* (2006.01)

(52) U.S. Cl. .................. 320/101; 320/136; 324/427

(58) Field of Classification Search .................. 320/101, 320/133, 155, 132, 136; 324/427
See application file for complete search history.

(56) References Cited

U.S. PATENT DOCUMENTS

| | | | |
|---|---|---|---|
| 5,498,950 A | 3/1996 | Ouwerkerk | |
| 6,081,095 A | 6/2000 | Tamura et al. | |
| 6,114,835 A * | 9/2000 | Price | 320/118 |
| 6,891,352 B2 * | 5/2005 | Miyazaki et al. | 320/118 |
| 6,975,094 B1 * | 12/2005 | Lascaud et al. | 320/122 |
| 7,193,392 B2 | 3/2007 | King et al. | |
| 2003/0030442 A1 * | 2/2003 | Sugimoto | 324/429 |
| 2004/0135544 A1 | 7/2004 | King et al. | |
| 2006/0022639 A1 * | 2/2006 | Moore | 320/116 |
| 2006/0164038 A1 | 7/2006 | Demers et al. | |

FOREIGN PATENT DOCUMENTS

| | | |
|---|---|---|
| CN | 1481059 | 3/2004 |
| JP | 11-299122 | 10/1999 |
| JP | 2001-86656 | 3/2001 |
| JP | 2002-42906 | 2/2002 |

(Continued)

OTHER PUBLICATIONS

Extended European Search Report dated Oct. 8, 2009, in corresponding European Patent Application No. 07253995.0.

*Primary Examiner* — Arun Williams
(74) *Attorney, Agent, or Firm* — Christie, Parker & Hale, LLP

(57) ABSTRACT

A battery management system and a driving method thereof to manage a battery including a plurality of cells. The battery management system includes a sensing unit, an MCU, and a cell balancing unit. The sensing unit measures cell voltages of the plurality of cells. The MCU detects cells requiring cell balancing according to the plurality of measured cell voltages and generates a plurality of cell voltage signals to control the cell balancing of the detected cells. The cell balancing unit balances the cells according to the plurality of cell voltage signals, and the number of the cell voltage signals is fewer than the number of cells. The cell balancing unit generates a plurality of cell balancing signals corresponding to each of the plurality of cell voltage signals, and at least one of the cell voltage signals balances at least two of cells in the battery.

22 Claims, 6 Drawing Sheets

FOREIGN PATENT DOCUMENTS

| | | |
|---|---|---|
| JP | 2002-101565 | 4/2002 |
| JP | 2003-240806 | 8/2003 |
| JP | 2005-151605 | 6/2005 |
| JP | 2005-304112 | 10/2005 |
| KR | 2004-92943 | 11/2004 |
| KR | 2006-79505 | 7/2006 |
| WO | WO 2004/030177 | 4/2004 |
| WO | WO 2006/079206 | 8/2006 |

\* cited by examiner

BATTERY MANAGEMENT SYSTEM TO MANAGE A BATTERY HAVING A PLURALITY OF CELLS AND DRIVING METHOD THEREOF

CROSS-REFERENCE TO RELATED APPLICATIONS

This application claims the benefit of Korean Patent Application No. 2006-99343, filed in the Korean Intellectual Property Office on Oct. 12, 2006, the disclosure of which is incorporated herein by reference.

BACKGROUND OF THE INVENTION

1. Field of the Invention

Aspects of the present invention relate to a battery management system. More particularly, aspects of the present invention relate to a battery management system for a vehicle using electric energy, and a driving method thereof.

2. Description of the Related Art

Vehicles using internal combustion engines with gasoline or diesel fuel pollute the environment through the burning of fossil fuels which produces air pollution. In order to reduce such pollution, there have been many attempts to develop an electric or a hybrid vehicle.

The electric vehicle is a vehicle using an electric motor that is driven by electrical energy produced from a battery. Such an electric vehicle does not produce exhaust gas and produces very little noise because the electric vehicle uses a battery pack formed of a plurality of rechargeable battery cells as a power source.

The hybrid vehicle is a vehicle that uses both an internal combustion engine and an electric motor. That is, hybrid vehicles use at least two power sources, for example, an internal combustion engine and a battery engine. Currently, hybrid vehicles have been developed to use an internal combustion engine with a fuel cell or use a battery with a fuel cell such that the fuel cell generates electrical energy through a chemical reaction, to which hydrogen and oxygen are continuously applied.

In order to enhance the power of a vehicle using a battery engine, the number of rechargeable battery cells has increased. The vehicle using the battery engine requires a battery management system (BMS) with a cell balancing control method to effectively manage a plurality of battery cells connected to each other.

Particularly, a control unit of the BMS is required to have more input and output ports as the number of the battery cells increases. Accordingly, the manufacturing cost of the control unit becomes increased, and the control unit occupies a larger area in the BMS.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of the present invention provide a battery management system and a driving method thereof to effectively and efficiently manage a plurality of battery cells. Aspects of the present invention provide a battery management system and a driving method thereof for efficiently managing battery cells as the number of cells in the battery increase. Further, the battery management system effectively and efficiently manages a number of cells using a micro control unit having fewer output ports than cells.

According to aspects of the present invention, there is provided a battery management system for managing a battery having a plurality of cells, including a sensing unit, a micro control unit (MCU), and a cell balancing unit. The sensing unit measures a cell voltage of each of the plurality of cells. The MCU detects cells requiring cell balancing according to the plurality of measured cell voltages, and generates a plurality of cell voltage signals to control the cell balancing of the detected cells. The cell balancing unit balances the cells according to the plurality of cell voltage signals. The number of the plurality of cell voltage signals is fewer than the number of the plurality of cells, the cell balancing unit generates a plurality of cell balancing signals corresponding to the plurality of cell voltage signals, and at least one of the plurality of cell voltage signals balances at least two cells. The MCU may generate a control signal corresponding to a cell voltage signal that balances at least two cells among the plurality of cell voltage signals transferred to the cell balancing unit, and the cell balancing unit may receive the cell voltage signal in response to the control signal. The cell voltage signal for balancing at least two cells is generated corresponding to one of the at least two cells, and another cell voltage signal is generated corresponding to the other of the at least two cell after a time interval.

The cell balancing unit may generate a first cell balancing signal and a second cell balancing signal to control cell balancing according to the cell voltage signal, and transfer the first cell balancing signal and the second cell balancing signal to the at least two cells, respectively, in response to the control signal. The cell balancing unit may generate the first cell balancing signal and the second cell balancing signal according to the control signal by distinguishing them by as much as a time interval. The cell balancing unit may charge/discharge cells corresponding to the first cell balancing signal and the second balancing signal according to the first cell balancing signal or the second balancing signal.

According to aspects of the present invention, there is provided a battery management system for managing a plurality of cells, including a MCU (micro control unit), a first cell balancing controller, a second cell balancing controller, and a cell balancing driver. The MCU generates a plurality of cell voltage signals and a plurality of controller selection signals to control a cell balancing operation for balancing cells requiring cell balancing among the plurality of cells, and outputs the generated cell voltage signals and controller selection signals to a plurality of output ports. The first cell balancing controller connected to the MCU receives a first plurality of cell voltage signals among the plurality of cell voltage signals according to one of the plurality of controller selection signals, and generates a cell balancing signal according to the first plurality of cell voltage signals. The second cell balancing controller connected to the MCU receives a second plurality of cell voltage signals among the plurality of cell voltage signals according to one of the plurality of controller selection signals, and generates a cell balancing signal according to the second plurality of cell voltage signals. The cell balancing driver connected to the first cell balancing controller and the second cell balancing receive the first and second pluralities of cell balancing signals, and balance cells that require cell balancing corresponding to the pluralities of the cell balancing signals. One of the first plurality of cell voltage signals and one of the second plurality of cell voltage signals are transmitted through a same output port of the MCU. When one of the first plurality of cell voltage signals and the one of the second plurality of cell voltage signals are transmitted through the same output port of the MCU, the cell voltage signals transmitted from the same output port may be transferred to the first cell balancing controller and the second cell balancing controller at a time interval according to the plurality of controller selection signals, and the first and second cell balancing controllers may generate cell balancing signals according to the cell voltage signals at the time interval and transfers the generated cell balancing signal to the cell balancing driver.

The first cell balancing controller may output one of the first plurality of cell balancing signals corresponding to the cell voltage signal transmitted from the same output port of the MCU, and the second cell balancing controller may transmit one of the second plurality of cell balancing signals corresponding to the cell voltage signal outputted from the same output port of the MCU at the time interval.

The cell balancing driver may include a plurality of switches each having a first end and a second end, wherein the first end of one of the plurality of switches is connected to a positive terminal of one of the plurality of cells, the second end of the one of the plurality of switches is connected to a negative terminal of the one of the plurality of cells, and the plurality of switches are turned on by the first and second pluralities of cell balancing signals. The battery management system may further include a plurality of photodiodes to emit light in response to the first and second pluralities of cell balancing signals, and a plurality of the first transistors photo-coupled to the plurality of photodiodes. The switches may be turned on in response to a current flowing through the first transistors. The switches may further include a second transistor having a first electrode and a second electrode corresponding to the both ends of thereof and a control electrode receiving a voltage corresponding to a current flowing through the first transistor, a first resistor having one end connected to the first electrode of the second transistor, and the other end connected to one end of the cell, and a second resistor having one end connected to a control electrode of the second transistor, and the other end connected to the other end of the cell.

According to aspects of the present invention, a driving method of a battery management system for a battery including a plurality of cells including a first group of cells having at least two cells and a second group of cells having at least two cells. In the driving method, cells requiring cell balancing are detected from the first group and the second group from a plurality of cells. Then, it determines whether a first cell requiring cell balancing from the first group corresponds with a second cell requiring cell balancing from the second group or not. If the first cell corresponds with the second cell, then one cell voltage signal is generated to control the cell balancing of the first cell and the second cell. On the contrary, if the first cell does not correspond with the second cell, cell voltage signals are generated for the first cell and the second cell. Then, the first cell and the second cell are balanced according to the cell voltage signals.

In the operation of detecting the cells, an average voltage of a battery may be calculated by summing voltages of each of the cells and dividing the sum by the number of cells in the battery. Then, it detects cells having a voltage difference between the calculated average voltage and voltages of the first and the second group cells is larger than a predetermined set-point. In the operation of generating one cell voltage signal, the cell voltage signal may be generated corresponding to the first cell, and the cell voltage is generated corresponding to the second cell after a time interval. In the operation of balancing the first and second cells, cell balancing signals may be generated for the first cell and the second cell at the time interval according to the cell voltage signal, and a cell balancing operation of the first cell and the second cell may be performed according to the cell balancing signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
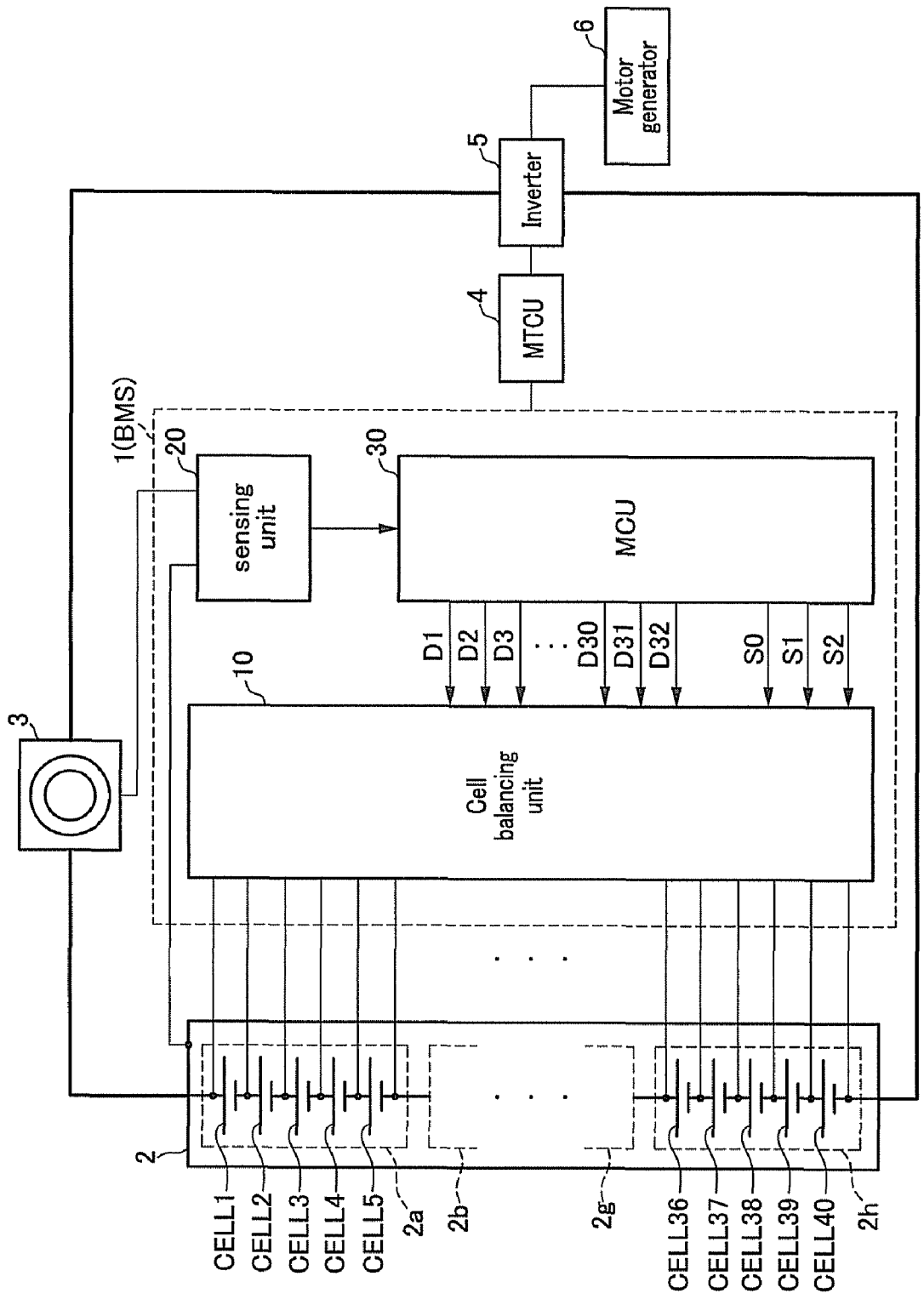
FIG. 1 is a diagram illustrating a battery, a battery management system (BMS), and peripheral devices thereof according to aspects of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a battery, a battery management system (BMS), and peripheral devices thereof according to aspects of the present invention. As shown in FIG. 1, a vehicle system includes a battery management system (BMS) 1, a battery 2, a current sensor 3, a motor control unit 4 (MTCU), an inverter 5, and a motor-generator 6.

The battery 2 includes a plurality of sub-packs $2a$ to $2h$ in which a plurality of battery cells are coupled in series. In FIG. 1, the battery 2 is shown to have eight sub-backs $2a$ to $2h$, and each of the sub-backs $2a$ to $2h$ comprises a plurality of battery cells. However, the present invention is not limited thereto. The battery 2 may include a greater or lesser number of sub-packs, and each sub-pack may include a greater or lesser number of battery cells. Further, the battery cells may be arranged in series or parallel, and the battery 2 may represent pluralities of batteries 2 arranged in series or parallel. Output terminals of the battery 2 are connected to the inverter 5.

The current sensor 3 measures an output current of the battery 2 and outputs the measured current to the sensing unit 20 of the BMS 1. The current sensor 3 may measure the current using a hall device. Such a current sensor 3 may be a hall current transformer (Hall CT) that outputs an analog current signal corresponding to the measured current, or a shunt resistor that output a voltage signal corresponding to a current value flowing through a resistor inserted on a load line.

The BMS 1 includes a cell balancing unit 10, a sensing unit 20, and a Micro control unit (MCU) 30. The cell balancing unit 10 balances the charge state of each cell. That is, the cell balancing unit 10 discharges a cell having a comparatively high charge state and charges a cell having a comparatively low charge state.

The sensing unit 20 measures and transfers the voltage V, the battery current I, and the battery temperature T of the battery to the MCU 30. The MCU 30 calculates an average voltage of all of the cells by adding up the voltages of the cells in the battery 2 and dividing the result by the number of cells in the battery 2. Then, the MCU 30 compares the calculated average voltage with a voltage of each cell in the battery 2. If the absolute value of the difference between the average voltage and the voltage of each cell is greater than a predetermined set-point voltage, the MCU 30 transfers a control signal to the cell balancing unit 10 to perform a cell balancing operation to balance the charge states of cells. The control signals according to aspects of the present invention includes cell voltage-signals D1 to D32, cell balancing activation signal S0, the first controller selection signal S1, and the second controller selection signal S2. The MCU 30 generates the cell voltage-signals D1 to D32, the cell balancing activation signal S0, the first controller selection signal S1, and the second controller selection signal S2, and transfers the generated signals to the cell balancing unit 10 through 35 input and output ports. The MCU 30 estimates a state of charge (SOC) of the battery 2 and a state of health (SOH) of the battery 2 using the voltage V, the battery current I, and the battery temperature T from the sensing unit 20, and controls a charging operation and a discharging operation of the battery.

The MTCU 4 analyzes the driving states of a vehicle based on information about an accelerator, a break, and a current speed of the vehicle and decides the necessary information such as torque level. Specifically, the driving state of a vehicle includes a KEY ON state in which the ignition of the vehicle is on, a KEY OFF state in which the ignition of the vehicle is off, a constant speed driving state, and an acceleration driving state. The MTCU 4 controls the output of the motor generator 6 to correspond with the torque information. That is, the MTCU 4 controls the switching operations of the inverter 5 so as to control the output of the motor generator 6 to correspond with the torque information. The MTCU 4 receives the SOC of the battery 2, transferred from the MCU 30, and controls the battery 2 to have a target SOC, e.g., 55%. For example, if the SOC of the MCU 30 is less than about 55%, the MTCU 4 controls the switch of the inverter 5 to output the current in a direction of the battery 2, thereby charging the battery 2. On the contrary, if the SOC is greater than about 55%, the MTCU 4 controls the switch of the inverter 5 to output the current in a direction to the motor-generator 6, thereby discharging the battery 2.

The inverter 5 charges and discharges the battery based on the control signal from the MTCU 4. The motor-generator 6 drives the vehicle using the electrical energy of the battery 2 based on the torque information transferred from the MTCU 4. Therefore, the MTCU 4 prevents the battery 2 from being overcharged or over-discharged by charging or discharging the battery 2 as much as a chargeable or dischargeable power amount based on the SOC. Therefore, the battery 2 can be efficiently used for a longer time. As it is difficult to measure the real SOC of the battery 2 after the battery 2 is installed in the vehicle, the BMS 1 needs to accurately estimate the SOC using the battery voltage and temperature measured by the sensing unit 10 and transfer the estimated SOC to the MTCU 4.

Figure 2:
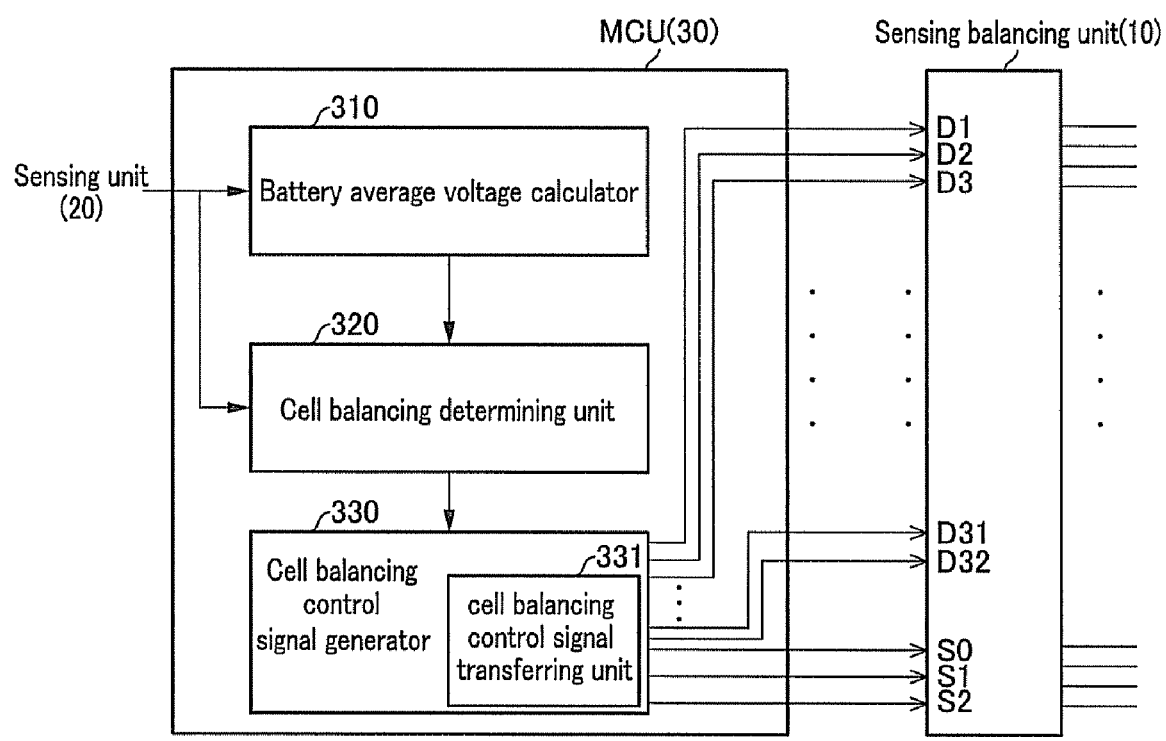
FIG. 2 is a block diagram illustrating an MCU according to aspects of the present invention.

FIG. 2 is a drawing illustrating an MCU according to aspects of the present invention that generates and transmits the cell balancing control signals D1-D32, S0, S1, and S2, which are transferred from the MCU 30 to the cell balancing unit 1. In FIG. 2, the battery 2 is described to include forty cells, and an MCU 30 is described to transfer cell voltage signals D1 to D32, a cell balancing activation signal S0, the first controller selection signal S1, and the second controller selection signal S2 to a cell balancing unit 10 using 35 input and output ports. However, the present invention is not limited thereto. The number of cell voltage-signals and controller selection signals may vary according to the number of cells. According to aspects of the present invention, the cell balancing activation signal S0, the first controller selection signal S1, the second controller selection signal S2, cell voltage signals D1 to D32, and cell balancing signal CB1 to CB40 are signals having a constant level voltage to control and perform a cell balancing operation.

As shown in FIG. 2, the MCU 30 includes a battery average voltage calculator 310, a cell balancing determining unit 320, a cell balancing control signal generator 330, and a cell balancing control signal transferring unit 331. The MCU 30 creates a total of thirty-five control signals and transfers the generated 35 control signals to the cell balancing unit 10.

The battery average voltage calculator 310 calculates the average voltage of all of the cells by adding up the voltages from each cell and dividing the result by the number of cells, which, in this example, is forty.

The cell balancing determining unit 320 compares the voltage of each cell transferred from the sensing unit 20 with the calculated average voltage transferred from the battery average voltage calculator 310. The cell balancing determining unit 320 detects a cell having a voltage higher or lower than the average voltage. If the absolute value of the difference between the calculated average voltage and the voltage of each cell is greater than a predetermined set-point voltage, the cell balancing determining unit 320 transfers information about the detected cell to the cell balancing control signal generator 330. According to aspects of the present invention, the information about a cell is information for identifying a cell having a voltage higher or lower than the average voltage that is beyond a range of voltages defined by the predetermined set-point voltage from the forty cells CELL1 to CELL40 of the battery 2. The cell information includes information about a location of the detected cell.

The cell balancing control signal generator 330 includes a cell balancing control signal transferring unit 331. The cell balancing control signal generator 330 generates thirty-two cell voltage signals D1 to D32, a cell balancing activation signal S0, the first controller selection signal S1, and the second controller selection signal S2 based on the information about the cell detected from the cell balancing determining unit 320.

Specifically, the cell balancing activation signal S0 is a signal to control the cell balancing unit 10 to receive control signals D1 to D32 and S1 and S2 from the MCU 30 for cell balancing. The first controller selection signal S1 and the second controller selection signal S2 are signals for efficiently managing the cell balancing of the forty cells. However, such a system is not limited to the forty cells such that the number of cells to be balanced can be greater than the number of input and output ports with which the MCU 30 uses to balance the cells. The BMS 1 according to aspects of the present invention classifies cells CELL1 to CELL32 as a first group and cells CELL33 to CELL40 as a second group. The first controller selection signal S1 and the second controller selection signal S2 correspond with each of the first group and the second group, respectively. That is, if the location of a cell requiring cell balancing is detected in the first group including the cells CELL1 to CELL32, the first controller selection signal S1 is transferred to the cell balancing unit 10 with the cell voltage signals D1 to D32 of the detected cell. Then, the cell balancing unit 10 recognizes that the cell requiring cell balancing is one of the cells in the first group of cells CELL1 to CELL32 by sensing the first controller selection signal S1 and accurately selects the detected cell that requires cell balancing based on the cell voltage signals D1 to D32. Similarly, if the location of a cell requiring cell balancing is detected in the second group including the cells CELL33 to CELL40, the second controller selection signal S2 is transferred to the cell balancing unit 10 with corresponding cell voltage signals D1 to D8. The cell balancing unit 10 recognizes that a detected cell requiring cell balancing is one of the cells in the second group of cells CELL33 to CELL40 by sensing the second controller selection signal S2 and accurately selects the detected cell that requires cell balancing based on the cell voltage signals D1 to D8.

The cell balancing control signal transferring unit 331 transfers cell voltage signals D1 to D32, a cell balancing activation signal S0, the first controller selection signal S1, and the second controller selection signal S2 to the cell balancing unit 10 for cell balancing. Particularly, the cell balancing control signal transferring unit 331 transfers the first controller selection signal S1 and the second controller selection signal S2 at a constant time interval. Therefore, if a cell requiring cell balancing is in the first group of cells CELL1 to CELL32 among entire 40 cells CELL1 to CELL40, the cell balancing control signal transferring unit 331 transfers cell voltage signals D1 to D32 of the cell requiring cell-balancing to the cell balancing unit 10 while transferring the first controller selection signal S1. Similarly, if a cell requiring cell balancing is in the second group of cells CELL33 to CELL40, the cell balancing control signal transferring unit 331 transfers the cell voltage signal D1 to D8 of the cell requiring cell balancing to the cell balancing unit 10 while transferring the second controller selection signal S2.

Figure 3:
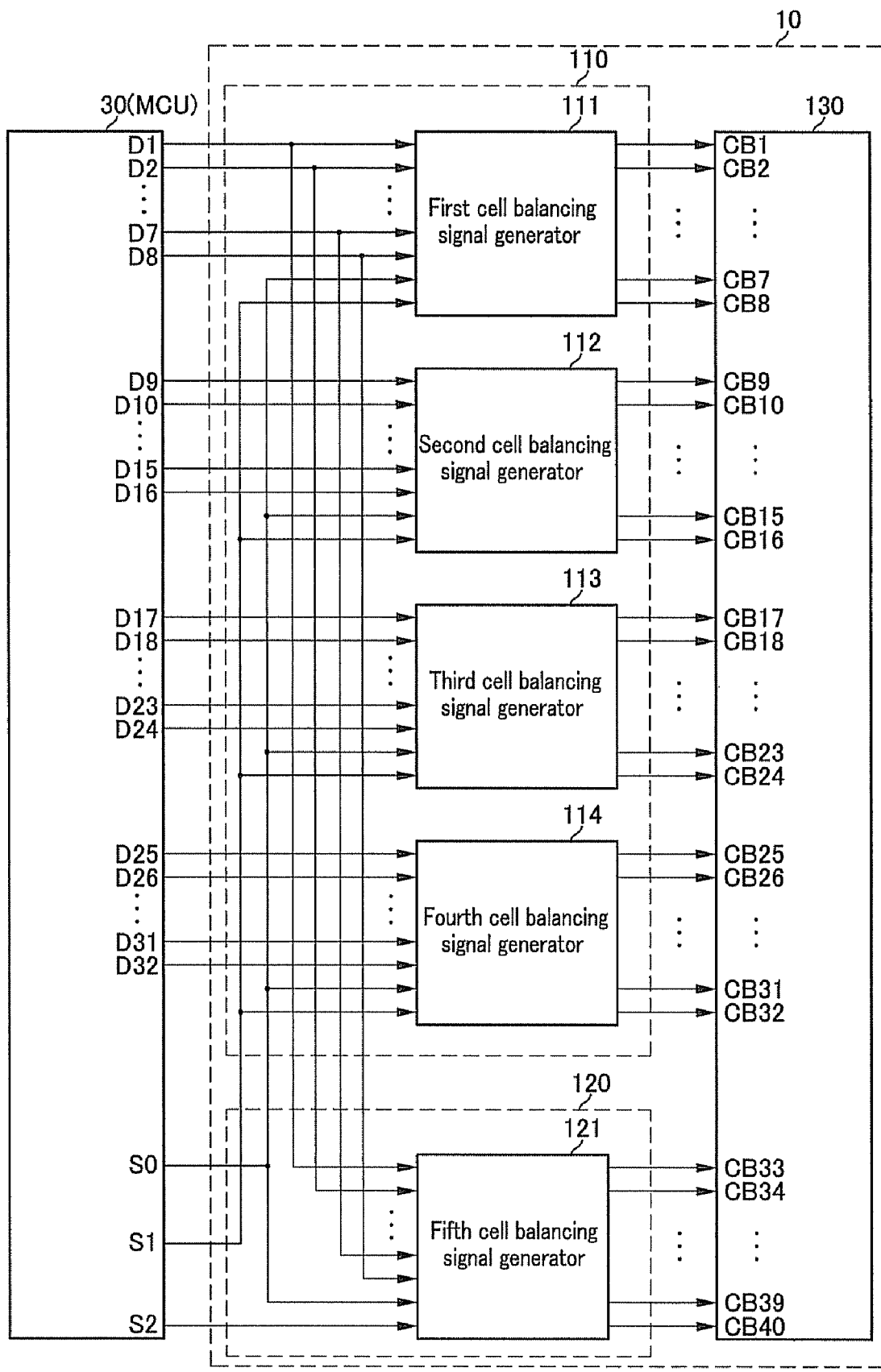
FIG. 3 is a block diagram illustrating elements of a cell balancing unit according to aspects of the present invention.

Hereinafter, a cell balancing unit 10 according to aspects of the present invention will be described. FIG. 3 is a block diagram illustrating elements of a cell balancing unit 10 according to aspects of the present invention.

The cell balancing unit 10 includes the first cell balancing controller 110, the second cell balancing controller 120, and a cell balancing driver 130. The cell balancing unit 10 receives a total of thirty-five control signals from the MCU 30, which are cell voltage signals D1 to D32, the cell balancing activation signal S0, the first controller selection signal S1, and the second controller selection signal S2. The first cell balancing controller 110 and the second cell balancing controller 120 of the cell balancing unit 10 are controlled to receive cell voltage signals D1 to D32, and the first and second controller selection signals S1 and S2 for cell balancing when the cell balancing activation signal S0 transits from a high level to a low level.

The first cell balancing controller 110 includes four cell balancing signal generators 111 and 114. The first cell balancing controller 110 receives thirty-two cell voltage signals D1 to D32, a cell balancing activation signal S0, and the first controller selection signal S1 from the MCU 30, and creates cell balancing signals CB1 to CB32 corresponding to the received cell voltage signals D1 to D32. Specifically, the first cell balancing controller 110 is controlled by the cell balancing activation signal S0 to receive the cell voltage signals D1 to D32 and the first controller selection signal S1. The first cell balancing controller 110 receives cell voltage signals D1 to D32 during a period where the first controller selection signal S1 has a high level voltage, creates the cell balancing signals CB1 to CB32 corresponding to the received cell voltage signals D1 to D32, and transfers the generated CB1 to CB 32 to the cell balancing driver 130.

The second cell balancing controller 120 includes a cell balancing signal generator 121, receives eight cell voltage signals D1 to D8, a cell balancing activation signal S0, and the second controller selection signal S2 from the MCU 30, and creates cell balancing signals CB33 to CB40 corresponding the received eight voltage signals D1 to D8. Specifically, the second cell balancing controller 120 is controlled by a cell balancing activation signal S0 to receive cell voltage signals D1 to D8, and the second controller selection signal S2. The second cell balancing controller 120 receives cell voltage signals D1 to D8 during a period where the second controller selection signal S2 has a high level voltage, creates cell balancing signals CB33 to CB40 corresponding to the cell voltage signals D1 to D8, and transfers the created cell balancing signals CB33 to CB40 to the cell balancing driver 130.

As the number of cells is limited by forty in this exemplary embodiment of the present invention, the second cell balancing controller 120 only includes a single cell balancing signal generator 121 unlike the first cell balancing controller 110, which includes first to fourth cell balancing signal generators 111 to 114. However, the present invention is not limited thereto. The number of second cell balancing controllers 120 may increase according to the number of cells configured in the battery 2. If the second cell balancing controller 120 has the same structure of the first cell balancing controller 110, a total of sixty-four cells can be controlled. That is, the MCU 30 can control the cell balancing of maximum sixty-four cells using thirty-five input and output ports. If the battery 2 has more than 64 cells, the cells can be efficiently managed with the limited input and output ports of the MCS 30 by reducing the number of cell voltage signals D1 to D32, and increasing the number of cell balancing controllers of the cell balancing unit 10.

Hereinafter, a timing diagram of a cell balancing control signal for performing a cell balancing operation according to aspects of the present invention will be described with reference to FIGS. 4 and 5.

Figure 4:
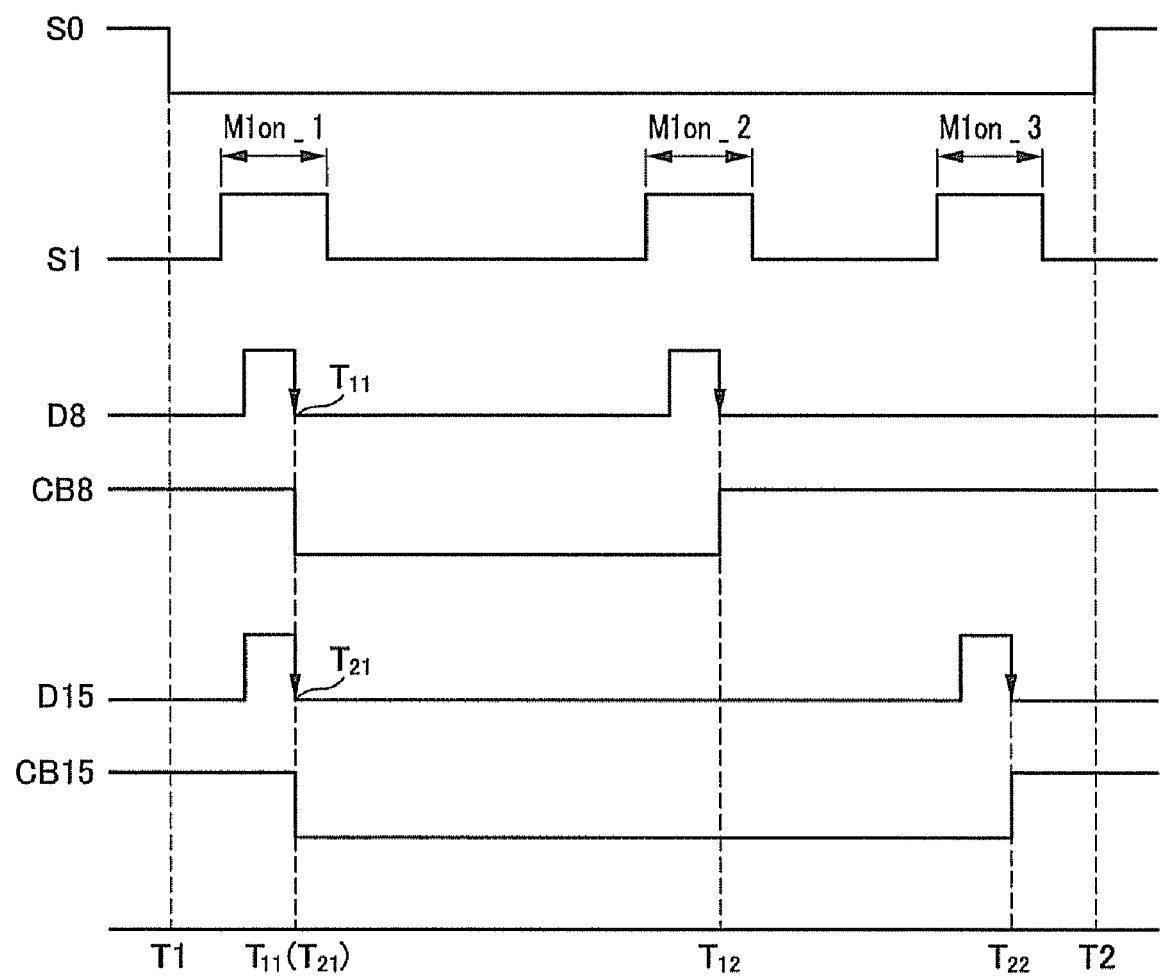
FIG. 4 is a timing diagram illustrating waveforms processed in a first cell balancing controller of a cell balancing unit according to aspects of the present invention.

FIG. 4 is a timing diagram illustrating waveforms processed in a first cell balancing unit of a cell balancing unit according to aspects of the present invention. That is, FIG. 4 shows waveforms of each cell balancing control signal when cells CELL8 and CELL15 have a higher or lower voltage than an average voltage of all of the cells CELL1 to CELL40 beyond that which is acceptable as defined by the predetermined set-point voltage or range.

The first cell balancing controller 110 of the cell balancing unit 10 receives a cell balancing activation signal S0, the first controller selection signal S1, and cell voltage signals D8 and D15 from the MCU 30, and generates the cell voltage signals CB8 to CB15 for each cell.

The first cell balancing signal generator 111 of the first cell balancing controller 110 is controlled to receive a first controller selection signal S1 and a cell voltage signal D8 at a time T1 when the cell balancing activation signal S0 is applied. The cell voltage signal D8 having a high level pulse is detected for a period M1on_1 when the first controller selection signal S1 is applied as a high level pulse. The first cell balancing signal generator 111 generates a low level cell balancing signal CB8 at a time T11 when the cell voltage signal D8 is falling. The second cell balancing signal generator 112 of the first cell balancing controller 110 is controlled to receive the first controller selection signal S1 and a cell voltage signal D15 at a time T1 when the cell balancing activation signal S0 is applied. The cell voltage signal D15, having a high level pulse, is applied during a period M1on_1 when the first controller selection signal S1 is a high level pulse. Then, the second cell balancing signal generator 112 generates a low level cell balancing signal CB15 at a time T21 when the cell voltage signal D15 is falling. The MCU 30 generates the first controller selection signal S1 having high level pulse periods M1on_2 and M1on_3 and the cell voltage signals D8 and D15, each being high level pulses, and transfers the generated first controller selection signal S1 to the cell balancing unit 10, thereby ending the cell balancing thereof. After ending the cell balancing of the CELL8, the first cell balancing signal generator 111 senses a cell voltage signal D8 having a high level pulse for a period M1on_2 when the first controller selection signal S1 is applied as a high level pulse. The first cell balancing signal generator 111 generates a high level cell balancing signal CB8 at a time T12 where the cell voltage signal D8 is falling, thereby ending the cell balancing thereof. Similarly, after the cell balancing of CELL15 ends, the second cell balancing signal generator 112 applies a cell voltage signal D15 having high level pulse for a period M1on_3 when the first controller selection signal S1 is applied as a high level pulse. At a time T22 when the cell voltage signal D15 is falling, a high level cell balancing signal CB15 is generated, thereby ending the cell balancing thereof.

Figure 5:
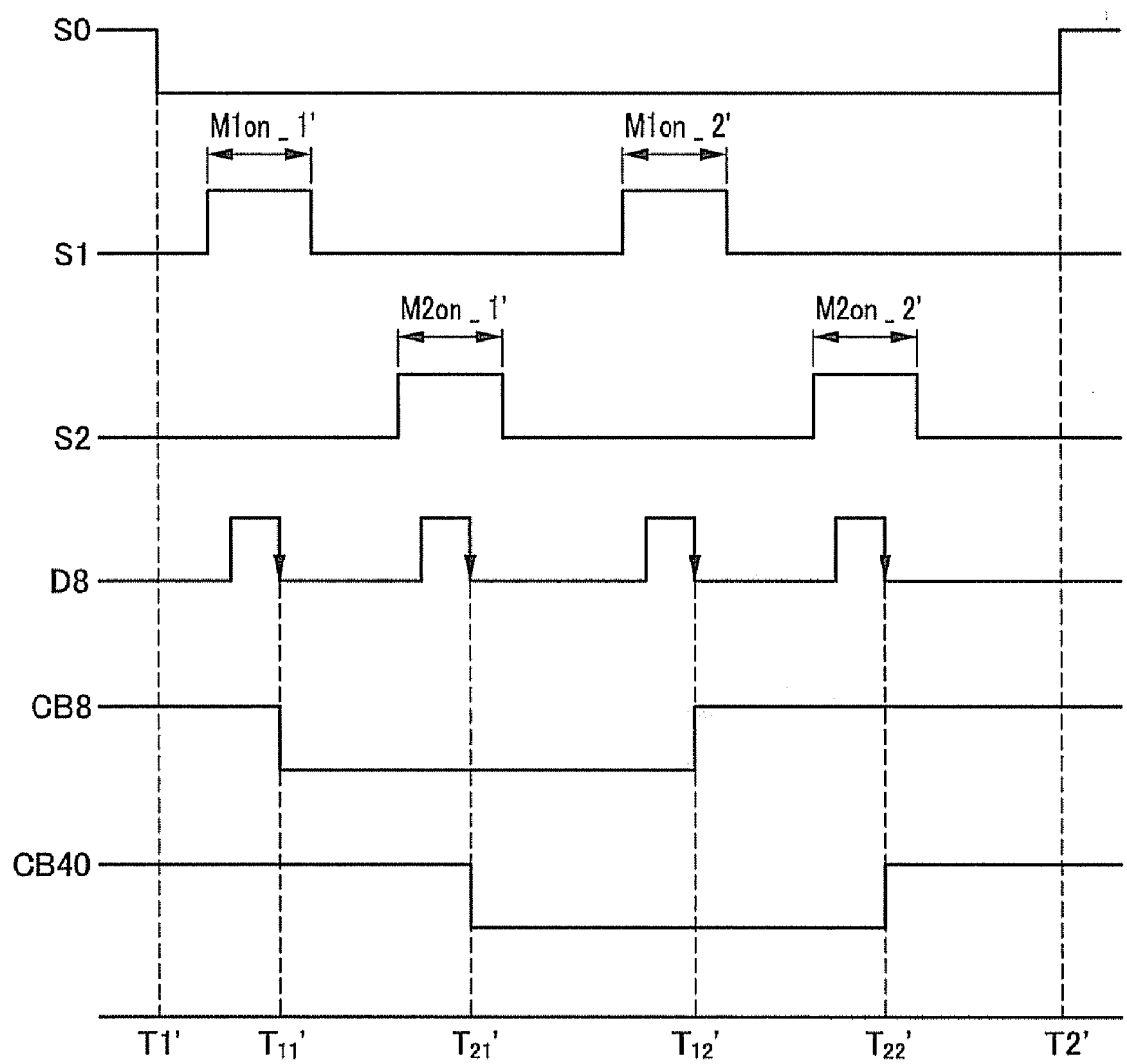
FIG. 5 is a timing diagram illustrating waveforms processed in each of cell balancing controllers of a cell balancing unit according to aspects of the present invention.

FIG. 5 is a timing diagram illustrating waveforms processed in first and second cell balancing controllers 110 and 120 of a cell balancing unit according to aspects of the present invention. That is, FIG. 5 shows waveforms of cell balancing control signals of each cell when cells CELL8 and CELL40 have a higher or lower voltage than an average voltage of all of the cells CELL1 to CELL40 beyond that which is acceptable as defined by the predetermined set-point voltage or range.

In order to balance cells CELL8 and CELL40, the first cell balancing controller 110 of the cell balancing unit 10 receives a cell balancing activation signal S0, the first controller selection signal S1, and a cell voltage signal D8 from the MCU 30, and generates cell voltage signal CB8 for the cell CELL8. The second balancing controller 120 of the cell balancing unit 10 receives a cell balancing activation signal S0, the second controller selection signal S2, and a cell voltage signal D8 from the MCU 30, and generates cell voltage signal CB40. The first and second cell balancing controllers both receive the cell voltage signal D8 from the MCU 30 as the cell voltage signal D8 is dedicated to the cells CELL8 and CELL40. For example, if the cells CELL8 and CELL39 were to be balanced, the first cell balancing controller 110 would receive the cell voltage signal D8, and the second cell balancing controller 120 would receive the cell voltage signal D7.

The first cell balancing signal generator 111 of the first cell balancing controller 110 is controlled to receive the first controller selection signal S1 and cell voltage signal D8 at a time T1' when the cell balancing activation signal S0 is applied. The cell voltage signal D8 having a high level pulse is applied during a period M1on_1' when the first controller selection signal S1 is applied as a high level pulse. Then, the first cell balancing signal generator 111 generates a low level cell balancing signal CB8 at a time T11' when the cell voltage signal D8, applied during the period M1on_1' in which the high level pulse of the first controller signal S1 is applied, is falling. Similarly, the fifth cell balancing signal generator 121 of the second cell balancing controller 120 is controlled to receive the second controller selection signal S2 and a cell voltage signal D8 at a time T1' when the cell balancing activation signal S0 is applied. Then, during a period M2on_1' when the second controller selection signal S2, applied after a predetermined time interval (about the difference between T21' and T11'), is applied as a high level pulse, the cell voltage signal D8, having a high level pulse, is applied. Then, the fifth cell balancing signal generator 121 generates a low level cell balancing signal CB40 at a time T21' when the cell voltage signal D8, applied during the period M2on_1' in which the high level pulse of the second controller signal S2 is applied, is falling. The MCU 30 generates the first controller selection signal S1 as a high level pulse during a period M1on_2', the second controller selection signal S2 as a high level pulse during a period M2on_2', and a cell voltage signal D8 having a high level pulse, and transfers the generated signals to the cell balancing unit 10, thereby ending the cell balancing operation. After ending the cell balancing operation of CELL8, the first cell balancing signal generator 111 of the balancing controller detects the cell voltage signal D8 having a high level pulse during the period M1on_2' when the first controller selection signal S1 has a high level pulse. At a time T12', when the cell voltage signal D8 is falling, the high level cell balancing signal CB8 is generated, thereby ending the cell balancing operation. Similarly, after the cell balancing operation of the CELL40 ends, the fifth cell balancing signal generator 121 of the second cell balancing controller 120 detects a cell voltage signal D8 having a high level pulse during the period M2on_2' when the second controller selection signal S2 is applied as a high level pulse. At a time T22', when a cell voltage signal D8 is falling, the high level cell balancing signal CB40 is generated, thereby ending the cell balancing operation.

Figure 6:
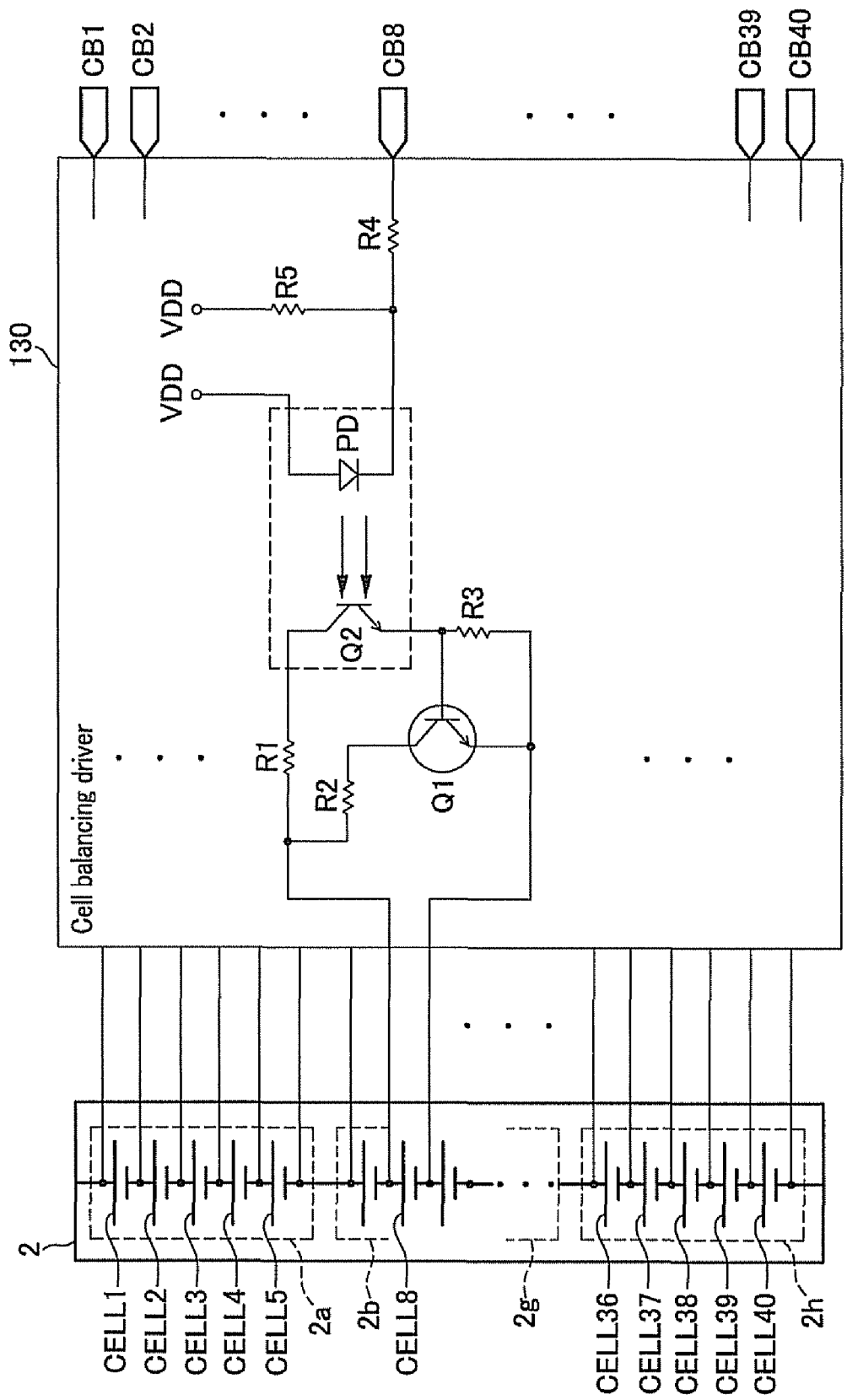
FIG. 6 is a circuit diagram illustrating a cell balancing driver of a cell balancing unit according to aspects of the present invention.

FIG. 6 is a circuit diagram illustrating a cell balancing driver 130 of a cell balancing unit 10, which controls cell balancing operations by receiving cell balancing signals CB1 to CB40 output from the first cell balancing controller 110 and the second cell balancing controller 120. The cell balancing driving circuit of the cell balancing driver 130 is connected to positive terminals (+) and negative terminals (−) of the cells CELL1 to CELL40 in of a battery 2, and performs a cell balancing operation by receiving cell balancing signals CB1 to CB40.

When a cell CELL8 among cells CELL1 to CELL40 has a higher or lower voltage than the average voltage of all of the cells CELL1 to CELL40 beyond that which is acceptable as defined by the predetermined set-point voltage or range, the cell balancing driver 130 of the cell balancing unit 10 receives a cell balancing signal CB8 from the first cell balancing signal generator 111 of the first cell balancing controller 110 and performs a cell balancing operation of the cell CELL8.

Specifically, during period T11' to T12' where the cell balancing signal CB8 is sustained as a low level after the cell balancing signal CB8 falls at time T11' of FIG. 5, the photodiode PD is biased by the voltage difference of VDD of a cell balancing driver 130 and the cell balancing signal CB8, thereby emitting light. Then, a transistor Q2 is turned on corresponding to the optical current generated from the photodiode PD. A partial current output from the positive terminal (+) of a cell CELL8 is applied to a resistor R3 through the turned on transistor Q2, and a transistor Q1 is turned on by the voltage difference generated at a resistor R3. Therefore, the cell CELL8 is balanced along a discharge path with current flowing from the positive terminal (+) of the cell CELL8 through the resistor R2 to a collector C of the turned on transistor Q1 to an emitter E. Although the cell balancing driver 130 is shown as comprising the photodiode PD, the transistors Q1 and Q2, and the resistors R1 to R5, the cell balancing driver 130 is not limited thereto. For example, instead of the photodiode PD, a diode having a direct electrical connection to the base B of the transistor Q2 may be used to turn on the transistor Q2. Further, the polarities of the transistors Q1 and Q2 may be switched or field effect transistors may be substituted.

According to aspects of the present invention, if the cells CELL8 and CELL40 have a voltage higher or lower than an average voltage of all of the cells CELL1 to CELL40 beyond that which is acceptable as defined by the predetermined set-point voltage or range, the first and second cell balancing controllers of the cell balancing unit 10 receives a single cell voltage signal D8 from the MCU 30, generates cell balancing signals CB8 and CB40 for the cells CELL8 and CELL40, and performs a cell balancing operation for balancing the cells CELL8 and CELL40. As each of the cell voltage signals D1 to D32 can balance at least two cells, the cell balancing of a battery having more than forty cells can be efficiently managed using the limited number of input and output ports of the MCU 30.

Although a few embodiments of the present invention have been shown and described, it would be appreciated by those skilled in the art that changes may be made in this embodiment without departing from the principles and spirit of the invention, the scope of which is defined in the claims and their equivalents.

According to the certain embodiments of the present invention, the MCU generates cell voltage signals fewer than the number of cells in a battery. Each of the generated cell voltage signals is transferred to the cell balancing unit and is used to balance at least two cells. Therefore, the BMS according to the embodiments of the present invention can efficiently manage a battery having a plurality of cells using the limited number of input and output ports of the MCU.

Conventionally, a MCU is required to have more number of input and output ports according to the increment of the number of cells in a battery, thereby increasing the manufacturing cost of the MCU and requiring a more area in the BMS. According to the certain embodiments of the present invention, since the limited input and output ports of the conventional MCU are used as it is, the manufacturing cost is prevented from increasing, and it does not occupy a large area of the BMS. Therefore, the MBS according to the embodiment of the present invention can efficiently manage the battery having a plurality of cells to be balanced.

What is claimed is:

1. A battery management system to manage a battery having a plurality of cells, comprising:
a sensing unit to measure a cell voltage of each cell of the plurality of cells;
a micro control unit (MCU) to detect cells that require cell balancing of the plurality of measured cell voltages, and to generate a plurality of cell voltage signals to control the cell balancing of the detected cells; and
a cell balancing unit to perform cell balancing operations to balance the detected cells according to the plurality of cell voltage signals,
wherein a number of the plurality of cell voltage signals is fewer than a number of the plurality of cells, the cell balancing unit generates a plurality of cell balancing signals corresponding to the plurality of cell voltage signals, and at least one of the plurality of cell voltage signals balances at least two cells of the plurality of cells.

2. The battery management system of claim 1,
wherein the MCU generates a plurality of controller selection signals corresponding to a cell voltage signal that balances at least two cells of the plurality of cells among the plurality of cell voltage signals transferred to the cell balancing unit having cell balancing controllers, and wherein the cell balancing unit receives the cell voltage signal in response to the plurality of controller selection signals.

3. The battery management system of claim 2, wherein the MCU generates the cell voltage signal corresponding to one of the at least two cells to balance the at least two cells, and generates the cell voltage signal corresponding to the other of the at least two cells after a time interval.

4. The battery management system of claim 3, wherein
the cell balancing unit generates a first cell balancing signal and a second cell balancing signal to control the cell balancing according to the cell voltage signal, and
transfers the first cell balancing signal and the second cell balancing signal to the at least two cells, respectively, in response to the plurality of controller selection signals.

5. The battery management system of claim 4, wherein the cell balancing unit generates the first cell balancing signal and the second cell balancing signal according to the plurality of controller selection signals by distinguishing the first and second cell balancing signals by as much as a time interval.

6. The battery management system of claim 5, wherein the cell balancing unit charges/discharges cells corresponding to the first cell balancing signal and the second balancing signal according to the first cell balancing signal or the second balancing signal.

7. A battery management system for managing a plurality of cells, comprising:
a MCU (micro control unit) to generate a plurality of cell voltage signals, a plurality of controller selection signals, and at least one cell balancing activation signal to control a cell balancing operation to balance voltages of cells among the plurality of cells, and to transmit the generated cell voltage signals and control signals to a plurality of output ports;
a first cell balancing controller connected to the MCU to receive a first plurality of the cell voltage signals according to one of the plurality of controller selection signals, and to generate a first plurality of cell balancing signals according to the first plurality of cell voltage signals;
a second cell balancing controller connected to the MCU to receive a second plurality of the cell voltage signals according to another of the plurality of controller selection signals, and to generate a second plurality of cell balancing signals according to the second plurality of cell voltage signals; and
a cell balancing driver connected to the first cell balancing controller and the second cell balancing controller to receive the first and second pluralities of cell balancing signals, and to balance the voltages of the cells corresponding to the cell balancing signal,
wherein one of the first plurality of cell voltage signals and one of the second plurality of cell voltage signals are transmittable through one of the plurality of output ports of the MCU.

8. The battery management system of claim 7, wherein
when one cell voltage signal of the first plurality of cell voltage signals and one cell voltage signal of the second plurality cell voltage signals are transmitted through a same output port of the plurality of the output ports of the MCU,
the cell voltage signals transmitted from the same output port of the plurality of output ports are respectively transferred to the first cell balancing controller and the second cell balancing controller separated by a time interval according to the plurality of controller selection signals, and the first and second cell balancing controllers respectively generate one of the first and one of the second pluralities of cell balancing signals according to the one of the first and the one of the second pluralities of cell voltage signals separated by the time interval and transfer the generated cell balancing signals to the cell balancing driver.

9. The battery management system of claim 8, wherein
the first cell balancing controller transmits the one of the first plurality of cell balancing signals from the same output port of the plurality of output ports of the MCU,
the second cell balancing controller transmits one of the second plurality of cell balancing signals from the same output port of the plurality of output ports of the MCU after the time interval.

10. The battery management system of claim 9, wherein the cell balancing driver comprises:
a plurality of switches each having a first end and a second end, wherein the first end of one of the plurality of switches is connected to a positive terminal of one of the plurality of cells, the second end of the one of the plurality of switches is connected to a negative terminal of the one of the plurality of cells, and the plurality of switches are turned on by the first and second pluralities of cell balancing signals.

11. The battery management system of claim 10, further comprising:
a plurality of photodiodes to emit light in response to the first and second pluralities of cell balancing signals; and
a plurality of the first transistors photo-coupled to the plurality of photodiodes,
wherein one switch of the plurality of switches is turned on in response to a current flowing through one first transistor of the plurality of first transistors.

12. The battery management system of claim 11, wherein each switch of the plurality of switches comprises:
a second transistor including a first electrode and a second electrode corresponding to the both ends thereof, and a control electrode to receive a voltage corresponding to a current flowing through the first transistor;
a first resistor having a first end connected to the first electrode of the second transistor, and a second end connected to a first end of the one of the plurality of cells; and
a second resistor having a first end connected to the control electrode of the second transistor, and a second end connected to a second end of the cell.

13. A driving method of a battery management system for a battery comprising a plurality of cells comprising a first group of cells comprising at least two cells and a second group of cells comprising at least two cells, comprising:
detecting cells that require cell balancing from the first group and the second group of the plurality of cells;
determining whether a first cell that requires cell balancing from the first group shares an output port of a control unit with a second cell that requires cell balancing from the second group;
generating one cell voltage signal to control the cell balancing of the first cell and the second cell if the first cell shares the output port with the second cell;
generating a first cell voltage signal for the first cell and a second cell voltage signal for the second cell if the first cell does not share the output port with the second cell; and
balancing the first cell and the second cell according to the cell voltage signals.

14. The driving method of claim 13, wherein the detecting cells further comprises:
calculating an average voltage of a battery by summing voltages of each cell of the plurality of cells and dividing the sum of the voltages of each cell by the number of cells in the plurality of cells; and
detecting cells that have a voltage difference comprising a difference between the calculated average voltage and a voltage of each cell,
wherein the detected cells are detected when the voltage difference is larger than a predetermined set-point.

15. The driving method of claim 13, wherein the generating one cell voltage further comprises, generating the one cell voltage signal corresponding to the first cell, and generating again the one cell voltage signal corresponding to the second cell after a time interval.

16. The driving method of claim 13, wherein the balancing further comprises:
generating cell balancing signals for the first cell and the second cell separated by a time interval according to the cell voltage signals; and
performing a cell balancing operation of the first cell and the second cell according to the cell balancing signals.

17. The battery management system of claim 1, wherein the cell balancing unit comprises:
a plurality of cell balancing controllers to receive the plurality of cell voltage signals from the MCU.

18. The battery management system of claim 17, wherein the MCU transmits the at least one of the plurality of cell voltage signals that balances at least two cells of the plurality of cells to at least two cell balancing controllers of the plurality of cell balancing controllers.

19. The battery management system of claim 18, wherein the at least two cell balancing controllers each generate a cell balancing signal to transmit to a corresponding cell of the plurality of cells.

20. The battery management system of claim 1, wherein the MCU generates a cell balancing activation signal to control the cell balancing unit.

21. The battery management system of claim 1, wherein each of the at least one of the plurality of cell voltage signals is utilized to generate at least two of the plurality of cell balancing signals.

22. The battery management system of claim 7, wherein the first cell balancing controller and the second cell balancing controller are directly connected to the MCU.

* * * * *

UNITED STATES PATENT AND TRADEMARK OFFICE
CERTIFICATE OF CORRECTION

PATENT NO. : 8,054,034 B2
APPLICATION NO. : 11/835055
DATED : November 8, 2011
INVENTOR(S) : Gye-Jong Lim et al.

Page 1 of 1

It is certified that error appears in the above-identified patent and that said Letters Patent is hereby corrected as shown below:

In the Claims

Column 12, Claim 6, line 23.        After "second" Insert -- cell --

Column 12, Claim 6, line 24.        After "second" Insert -- cell --

Column 12, Claim 8, line 58.        After "plurality" Insert -- of --

Column 13, Claim 9, line 11.        After "MCU," Insert -- and --

Signed and Sealed this
Tenth Day of September, 2013

Teresa Stanek Rea
*Acting Director of the United States Patent and Trademark Office*